(12) United States Patent
Rose et al.

(10) Patent No.: US 9,509,772 B1
(45) Date of Patent: Nov. 29, 2016

(54) VISUALIZATION AND CONTROL OF ONGOING INGRESS ACTIONS

(71) Applicant: Google Inc., Mountain View, CA (US)

(72) Inventors: Robert Brett Rose, Boulder, CO (US); Michael Jeffrey Procopio, Boulder, CO (US)

(73) Assignee: GOOGLE INC., Mountain View, CA (US)

( * ) Notice: Subject to any disclaimer, the term of this patent is extended or adjusted under 35 U.S.C. 154(b) by 331 days.

(21) Appl. No.: 14/179,901

(22) Filed: Feb. 13, 2014

(51) Int. Cl.
  *H04L 29/08* (2006.01)
(52) U.S. Cl.
  CPC ................... *H04L 67/1097* (2013.01)
(58) Field of Classification Search
  CPC ..... H04L 67/10; H04L 51/32; H04L 12/581; H04L 12/5825; H04L 65/4023; G06F 17/30017; G06F 17/30165; G06F 3/04842; H04N 21/25841
  See application file for complete search history.

(56) References Cited

U.S. PATENT DOCUMENTS

| | | | |
|---|---|---|---|
| 5,579,471 A | 11/1996 | Barber et al. | |
| 6,006,239 A | 12/1999 | Bhansali et al. | |
| 6,009,405 A | 12/1999 | Leymann et al. | |
| 6,119,165 A | 9/2000 | Li et al. | |
| 6,314,105 B1 | 11/2001 | Luong | |
| 6,449,688 B1 | 9/2002 | Peters et al. | |
| 6,507,845 B1 * | 1/2003 | Cohen | G06Q 10/10 707/608 |
| 6,590,568 B1 | 7/2003 | Astala et al. | |
| 6,614,804 B1 | 9/2003 | McFadden et al. | |
| 6,687,735 B1 | 2/2004 | Logston et al. | |
| 6,711,557 B1 | 3/2004 | Palaniappan | |
| 6,947,396 B1 | 9/2005 | Salmi | |
| 7,030,861 B1 | 4/2006 | Westerman et al. | |
| 7,113,917 B2 | 9/2006 | Jacobi et al. | |
| 7,146,377 B2 | 12/2006 | Nowicki et al. | |
| 7,386,576 B2 | 6/2008 | Watanabe et al. | |
| 7,536,386 B2 | 5/2009 | Samji et al. | |

(Continued)

FOREIGN PATENT DOCUMENTS

| | | |
|---|---|---|
| EP | 0371608 | 6/1990 |
| EP | 1275222 | 1/2003 |

(Continued)

OTHER PUBLICATIONS

ISR & Written Opinion, RE: Application # PCT/US2015/020375; Jun. 12, 2015.

(Continued)

*Primary Examiner* — Peling Shaw
(74) *Attorney, Agent, or Firm* — Young Basile Hanlon & MacFarlane, P.C.

(57) ABSTRACT

A method includes providing, by a server computer, a shared storage space for receiving and storing data from a plurality of data sources. The method further includes obtaining real-time ingress information describing at least one ongoing ingress action currently being performed between one of the plurality of data sources and the shared storage space. The method further includes outputting, for display in an ingress dashboard associated with the shared storage space, an ingress activity notification based on the at least one ongoing ingress action. The ingress activity notification can include means configured for selection by a user to interrupt the ongoing ingress action as well as means configured for selection by the user to generate an alert associated with the ongoing ingress action.

20 Claims, 5 Drawing Sheets

(56) References Cited

U.S. PATENT DOCUMENTS

| | | |
|---|---|---|
| 7,620,902 B2 | 11/2009 | Manion et al. |
| 7,660,902 B2 | 2/2010 | Graham et al. |
| 7,711,771 B2 | 5/2010 | Kirnos |
| 7,756,821 B2 | 7/2010 | Havens et al. |
| 7,821,405 B2 | 10/2010 | Heidloff et al. |
| 7,827,299 B2 | 11/2010 | Cadarette et al. |
| 7,904,303 B2 | 3/2011 | Chien et al. |
| 7,908,183 B2 | 3/2011 | Jacobi et al. |
| 7,940,685 B1* | 5/2011 | Breslau ............... H04L 43/0835 370/251 |
| 7,945,600 B1 | 5/2011 | Thomas et al. |
| 8,041,672 B2 | 10/2011 | Ogawa et al. |
| 8,132,111 B2 | 3/2012 | Baron et al. |
| 8,156,059 B2 | 4/2012 | Dunning et al. |
| 8,194,986 B2 | 6/2012 | Conwell |
| 8,196,047 B2 | 6/2012 | Fisher et al. |
| 8,285,700 B2 | 10/2012 | Steelberg et al. |
| 8,298,087 B1 | 10/2012 | Smith |
| 8,407,613 B2 | 3/2013 | Hope |
| 8,412,731 B2 | 4/2013 | Aubert et al. |
| 8,417,000 B1 | 4/2013 | Mendis |
| 8,429,565 B2 | 4/2013 | Agarawala et al. |
| 8,458,174 B1 | 6/2013 | Duerig |
| 8,464,184 B1 | 6/2013 | Cook et al. |
| 8,467,955 B2 | 6/2013 | Jiang et al. |
| 8,468,164 B1 | 6/2013 | Paleja et al. |
| 8,479,122 B2 | 7/2013 | Hotelling et al. |
| 8,504,565 B2 | 8/2013 | Pitts |
| 8,522,230 B2 | 8/2013 | Nathan et al. |
| 8,522,258 B1 | 8/2013 | Shaw |
| 8,532,400 B1 | 9/2013 | Babenko et al. |
| 8,547,352 B2 | 10/2013 | Park et al. |
| 8,548,844 B2 | 10/2013 | Steelberg et al. |
| 8,555,173 B2 | 10/2013 | Kast |
| 8,560,975 B2 | 10/2013 | Beaver et al. |
| 8,571,331 B2 | 10/2013 | Cifarelli |
| 8,584,022 B1 | 11/2013 | O'Shaughnessy et al. |
| 8,612,439 B2 | 12/2013 | Prahlad et al. |
| 8,612,470 B1 | 12/2013 | Fushman et al. |
| 8,624,836 B1 | 1/2014 | Miller et al. |
| 8,638,312 B2 | 1/2014 | Lim |
| 8,644,688 B2 | 2/2014 | Fishman et al. |
| 8,661,053 B2 | 2/2014 | Flynn et al. |
| 8,670,597 B2 | 3/2014 | Petrou et al. |
| 2002/0054117 A1* | 5/2002 | van Dantzich ....... G06F 3/0482 715/766 |
| 2002/0099844 A1 | 7/2002 | Baumann et al. |
| 2002/0112116 A1 | 8/2002 | Nelson |
| 2002/0116399 A1* | 8/2002 | Camps ................... G06F 17/24 |
| 2002/0167538 A1 | 11/2002 | Bhetanabhotla |
| 2002/0178271 A1 | 11/2002 | Graham et al. |
| 2002/0184375 A1 | 12/2002 | Wagner et al. |
| 2003/0184653 A1 | 10/2003 | Ohkubo |
| 2003/0208490 A1 | 11/2003 | Larrea et al. |
| 2004/0135904 A1 | 7/2004 | Shiota et al. |
| 2004/0189707 A1 | 9/2004 | Moore et al. |
| 2005/0033777 A1 | 2/2005 | Moraes et al. |
| 2005/0131992 A1 | 6/2005 | Goldstein et al. |
| 2006/0059174 A1 | 3/2006 | Mese et al. |
| 2006/0159127 A1 | 7/2006 | Childress et al. |
| 2006/0229932 A1 | 10/2006 | Zollo et al. |
| 2006/0242581 A1 | 10/2006 | Manion et al. |
| 2007/0250401 A1 | 10/2007 | Hearn et al. |
| 2008/0123904 A1 | 5/2008 | Sakamoto et al. |
| 2008/0126476 A1 | 5/2008 | Nicholas et al. |
| 2008/0165141 A1 | 7/2008 | Christie |
| 2008/0177623 A1 | 7/2008 | Fritsch et al. |
| 2008/0195956 A1 | 8/2008 | Baron et al. |
| 2008/0270398 A1 | 10/2008 | Landau et al. |
| 2009/0112868 A1 | 4/2009 | Rajamani et al. |
| 2009/0327975 A1 | 12/2009 | Stedman |
| 2010/0017426 A1 | 1/2010 | Marston |
| 2010/0046392 A1 | 2/2010 | Childress et al. |
| 2010/0070707 A1 | 3/2010 | Nishimura |
| 2010/0161441 A1 | 6/2010 | Hounsell |
| 2010/0211575 A1 | 8/2010 | Collins et al. |
| 2010/0241971 A1 | 9/2010 | Zuber |
| 2010/0250337 A1 | 9/2010 | Kassaei |
| 2010/0251305 A1 | 9/2010 | Kimble et al. |
| 2010/0256981 A1 | 10/2010 | Nielsen et al. |
| 2010/0332846 A1 | 12/2010 | Bowden et al. |
| 2010/0332958 A1 | 12/2010 | Weinberger et al. |
| 2011/0010672 A1 | 1/2011 | Hope |
| 2011/0044512 A1 | 2/2011 | Bambha et al. |
| 2011/0208668 A1 | 8/2011 | Phillips |
| 2011/0289423 A1 | 11/2011 | Kim et al. |
| 2012/0032436 A1 | 2/2012 | Zantout et al. |
| 2012/0072449 A1 | 3/2012 | Patch et al. |
| 2012/0078845 A1 | 3/2012 | Kasbekar et al. |
| 2012/0084689 A1 | 4/2012 | Ledet et al. |
| 2012/0089610 A1 | 4/2012 | Agrawal et al. |
| 2012/0096046 A1 | 4/2012 | Kucera |
| 2012/0136936 A1* | 5/2012 | Quintuna .............. G06F 21/604 709/204 |
| 2012/0192086 A1* | 7/2012 | Ghods ................. G06Q 10/10 715/753 |
| 2012/0197980 A1 | 8/2012 | Terleski et al. |
| 2012/0213404 A1 | 8/2012 | Steiner |
| 2012/0233227 A1 | 9/2012 | Alexander et al. |
| 2012/0254332 A1 | 10/2012 | Irvin |
| 2012/0290609 A1 | 11/2012 | Britt |
| 2012/0290926 A1 | 11/2012 | Kapadia et al. |
| 2012/0290947 A1 | 11/2012 | Baggett et al. |
| 2012/0303477 A1 | 11/2012 | Ben-Itzhak |
| 2012/0303684 A1 | 11/2012 | Sakurai et al. |
| 2012/0324368 A1* | 12/2012 | Putz ...................... G06F 3/0486 715/748 |
| 2013/0014023 A1 | 1/2013 | Lee et al. |
| 2013/0024464 A1 | 1/2013 | Berner et al. |
| 2013/0073976 A1* | 3/2013 | McDonald ............ G06Q 10/00 715/739 |
| 2013/0080940 A1 | 3/2013 | Reeves et al. |
| 2013/0104080 A1 | 4/2013 | Bosworth et al. |
| 2013/0129076 A1* | 5/2013 | Kannan .............. H04M 3/5175 379/265.09 |
| 2013/0132896 A1 | 5/2013 | Lee et al. |
| 2013/0138674 A1 | 5/2013 | Jeong et al. |
| 2013/0138685 A1 | 5/2013 | Brucher et al. |
| 2013/0173637 A1 | 7/2013 | Kim et al. |
| 2013/0185638 A1 | 7/2013 | Tischer |
| 2013/0188886 A1 | 7/2013 | Petrou et al. |
| 2013/0202198 A1 | 8/2013 | Adam et al. |
| 2013/0263289 A1 | 10/2013 | Vijayan et al. |
| 2013/0339435 A1 | 12/2013 | De Armas |
| 2014/0019317 A1 | 1/2014 | Casares et al. |
| 2014/0019910 A1 | 1/2014 | Kim et al. |
| 2014/0029798 A1 | 1/2014 | Flynn et al. |
| 2014/0067702 A1 | 3/2014 | Rathod |
| 2014/0068443 A1 | 3/2014 | Eng et al. |
| 2014/0136594 A1* | 5/2014 | Belmonte ............... H04L 51/00 709/202 |
| 2014/0164535 A1 | 6/2014 | Lynch et al. |
| 2014/0236722 A1 | 8/2014 | Rathus et al. |
| 2014/0317552 A1 | 10/2014 | Romatoski |
| 2015/0193521 A1 | 7/2015 | Schoeffler et al. |
| 2015/0363062 A1 | 12/2015 | Gunn |
| 2015/0363640 A1 | 12/2015 | Meyer |

FOREIGN PATENT DOCUMENTS

| | | |
|---|---|---|
| EP | 2187322 A1 | 5/2010 |
| EP | 2458512 | 5/2012 |
| WO | WO0051021 | 8/2000 |
| WO | WO03090096 | 10/2003 |
| WO | WO2007085083 | 8/2007 |
| WO | WO2009032712 | 3/2009 |
| WO | WO2012092025 | 7/2012 |

OTHER PUBLICATIONS

ISR and Written Opinion of the International Searching Authority for International Application No. PCT/US2015010618, Mar. 25, 2015.

(56) References Cited

OTHER PUBLICATIONS

ISR & Written Opinion, RE: Application #PCT/US2015/020378; Aug. 18, 2015.
Automatic Album Maker Moment.me Arrives on Android, Adds A "Manual Mode" Mode to Boost Engagement, TechCrunch, Feb. 18, 2013, http://techcrunch.com/2013/02/18/automatic-album-maker-moment-me-arrives-on-android-adds-a-manual-mode-mode-to-boost-engagement/.
Flayvr, A. Mobile App That Automatically Creates Photo Albums, Raises $450K Seed Round, TechCrunch, Oct. 4, 2012, http://techcrunch.com/2012/10/04/flayvr-a-mobile-app-that-automatically-creates-photo-albums-raises-450k-seed-round/.
Larson, Michael, "Probing Network Characteristics: A Distributed Network Performance Framework", Dr. Dobb's Journal, Jun. 2004, pp. 22-29.
Lowe, D., "Object recognition from local scale-invariant features," International Conference on Computer Vision Corfu, Greece (Sep. 1999) pp. 1150-1157.

* cited by examiner

VISUALIZATION AND CONTROL OF ONGOING INGRESS ACTIONS

BACKGROUND

The disclosure relates to an apparatus and methods for visualizing and controlling ongoing ingress actions associated with a shared storage space.

Computer systems are known that allow multiple data sources to send and store data within a single storage space. As one example, a user can upload files to a remote server and access the files from different locations via a network such as the internet. In another example, a cloud-based storage space may receive concurrent file uploads from a variety of user-initiated data sources. These data sources can include mobile devices, third-party applications, cloud-based operating systems, and synchronization applications accessing files on various user devices such as tablets, desktop computers, and laptop computers.

Though viewing and managing the transfer of data to the shared storage space separately from each of the various transferring data sources is possible, there is no method of both viewing and managing this incoming data flow, i.e. the ongoing ingress actions, from the receiving end, i.e. the shared storage space.

SUMMARY

The disclosure relates to an apparatus and methods for visualizing and controlling ongoing ingress actions associated with activity between a plurality of data sources and a shared storage space.

One aspect of the disclosed embodiments is a method that includes providing, by a server computer, a shared storage space for receiving and storing data from a plurality of data sources; obtaining real-time ingress information describing at least one ongoing ingress action currently being performed between one of the plurality of data sources and the shared storage space; and outputting, for display in an ingress dashboard associated with the shared storage space, an ingress activity notification based on the at least one ongoing ingress action.

Another aspect of the disclosed embodiments is an apparatus that includes one or more processors and one or more memory devices for storing program instructions used by the one or more processors. The program instructions, when executed by the one or more processors, cause the one or more processors to provide a shared storage space for receiving and storing data from a plurality of data sources; obtain real-time ingress information describing at least one ongoing ingress action currently being performed between one of the plurality of data sources and the shared storage space; and output, for display in an ingress dashboard associated with the shared storage space, an ingress activity notification based on the at least one ongoing ingress action.

BRIEF DESCRIPTION OF THE DRAWINGS

The description makes reference to the accompanying drawings wherein like reference numerals refer to like parts throughout the several views, and wherein.

DETAILED DESCRIPTION

Methods for visualizing and controlling ongoing ingress actions associated with activity between a plurality of data sources and a shared storage space are described here. An example method can include providing a shared storage space to receive and store data from a plurality of data sources, for example, data sources such as different computing devices operated by various users. The method can also include obtaining real-time ingress information that describes an ongoing ingress action, that is, an action such as synchronizing or uploading, that is currently being performed between one of the data sources and the shared storage space. The method can also include displaying an ingress activity notification based on the ongoing ingress action within an ingress dashboard. The ingress activity notification can include information, for example, identifying the source of the data, the type of ongoing action, or the data storage location. The ingress dashboard can be a user interface including multiple ingress activity notifications as well as means for a user to control the ongoing ingress actions associated with the ingress activity notifications.

Figure 1:
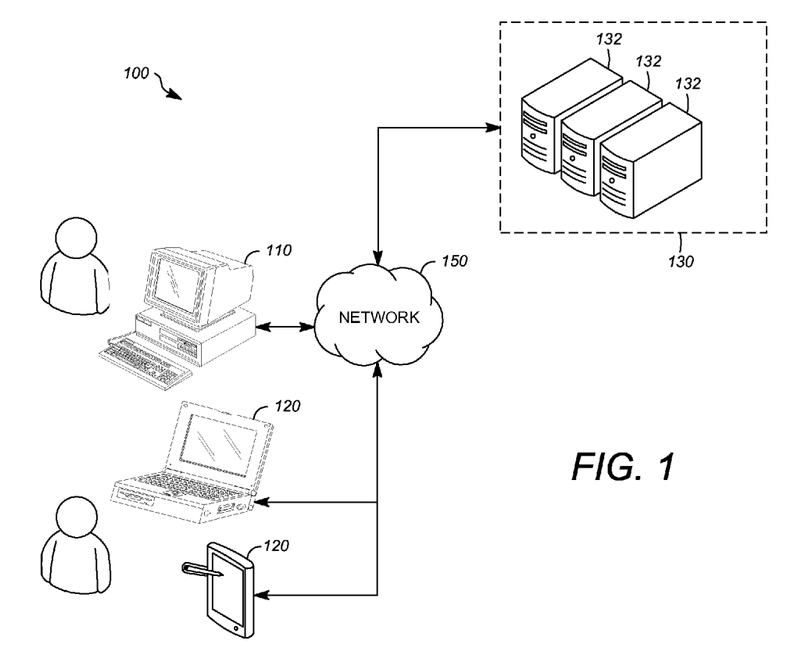
FIG. 1 is a block diagram showing an example of an environment in which a system for visualizing and controlling ongoing ingress actions can be implemented.

FIG. 1 is a block diagram showing an example of an environment 100 in which a system for visualizing and controlling ongoing ingress actions can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet. The application hosting service 130 can provide access to one or more hosted applications to a defined group of users associated with the user system 110 and the additional user systems 120. As used here, a shared storage space is any manner of system, program, or interface that allows a single user with multiple user systems 110, 120 or a plurality of users each with one or more user systems 110, 120 to send data to and store data at, for example, the one or more server computers 132 of the application hosting service 130. In some implementations, the application hosting service 130 allows a particular shared storage space to be accessed upon presentation of a credential, such as a username and password combination, that are associated with a registered user of that particular shared storage space. In some implementations, one or more users of the shared storage space are able to grant access to additional users or revoke access from existing users.

Figure 2:
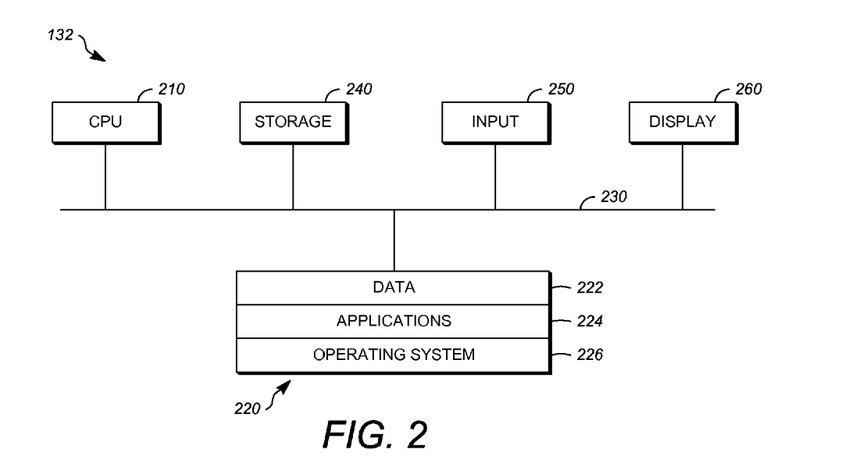
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
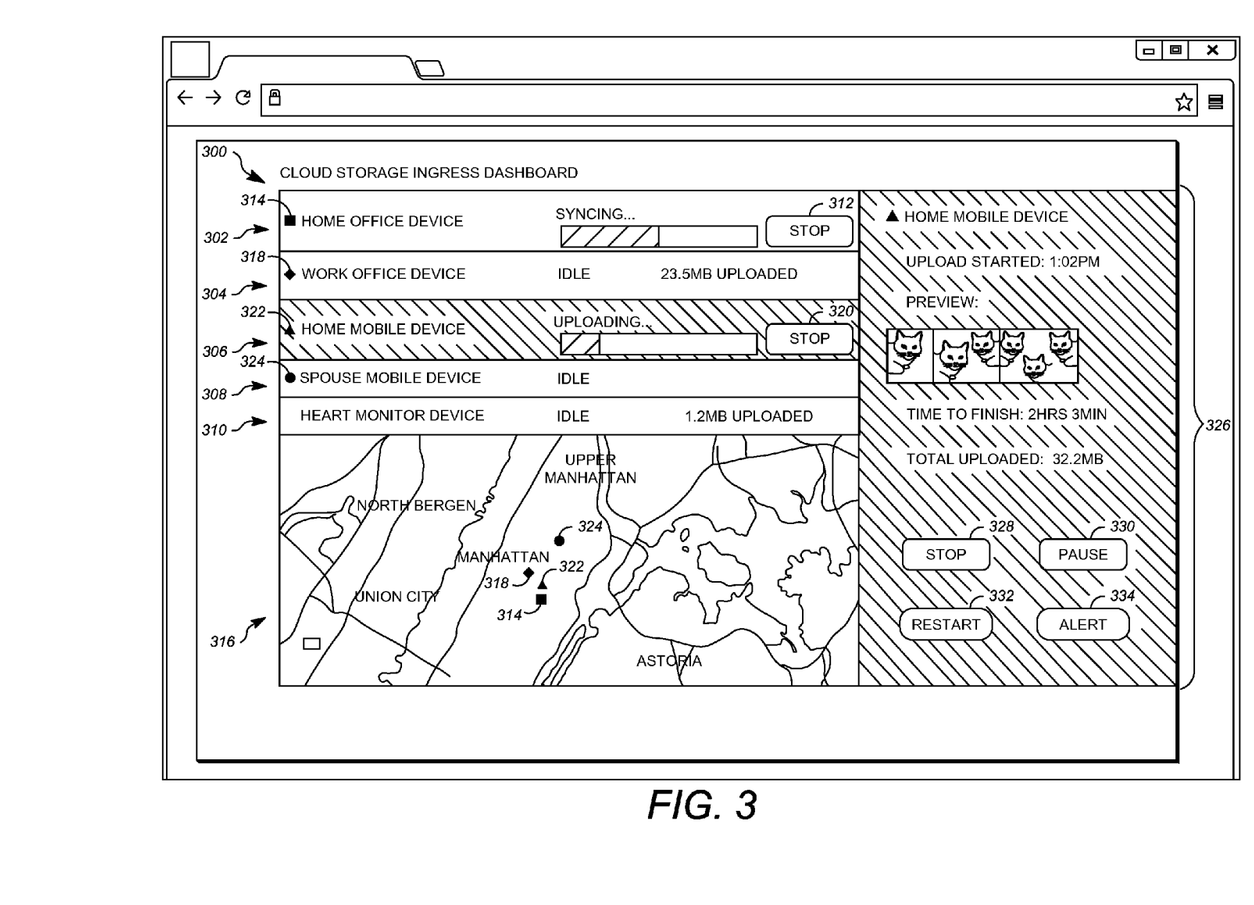
FIG. 3 shows an example ingress dashboard for ongoing ingress actions associated with a shared storage space.

FIG. 3 shows an example ingress dashboard 300 for ongoing ingress actions associated with a shared storage space, such as the shared storage space displayed within the example interface of FIG. 4 described below. The ingress dashboard 300 associated with the shared storage space can be a web based interface that can be output for display in the context of a web browser by way of a web page that is encoded in a markup language such as HTML that is transmitted from the application hosting service 130 to one or more of the user systems 110, 120 and output for display at one or more of the user systems 110, 120. Other types of interfaces are also possible. The shared storage space associated with the ongoing ingress actions can be provided, for example, by one or more of the server computers 132 and can receive and store data from a plurality of data sources, such as user systems 110, 120. An example of a shared storage space is further described below.

In the illustrated example, the ingress dashboard 300 includes ingress activity notifications 302, 304, 306, 308, 310 associated with ongoing ingress actions being performed between one of the plurality of data sources and a shared storage space. Examples of ongoing ingress actions include data transfers through web-based uploads, through synchronization client application activity, through cloud-based upload appliances, through operating system-initiated uploads from external storage drives, and through third-party application integrations such as manual or automatic saving of attachments or other files or content from mail-based applications, calendar applications, social network applications, or any other application accessible, for example, from one of the user systems 110, 120 and configured to create or access data capable of being stored. The term "ongoing ingress action" can represent any of the above described data transfers from various data sources to the shared storage space, but is not limited to the examples given.

The ingress activity notifications 302, 304, 306, 308, 310 can be used to provide insight to the user of the ingress dashboard 300 as to ongoing ingress actions currently being performed between one of the plurality of data sources and the shared storage space. In order to generate one of the ingress activity notifications 302, 304, 306, 308, 310 for display within the ingress dashboard 300, the applicable server computer 132 can obtain real-time ingress information describing an ongoing ingress action currently being performed between one of the plurality of data sources and the shared storage space.

The real-time ingress information obtained regarding an ongoing ingress action can include information describing, for example, the identification of a data source, the identification of a state of the ongoing ingress action being performed, and the identification of the data storage location within the shared storage space where the data is being transferred. The real-time ingress information can also include information describing, for example, the amount of storage within the shared storage space being allocated to the data associated with the ongoing ingress action or how much bandwidth is being used by the ongoing ingress action. Similarly, historical activity information describing completed actions that were previously performed between one of the plurality of data sources and the shared storage space can be collected and displayed within the ingress dashboard 300.

The ingress activity notifications 302, 304, 306, 308, 310 can also include means configured for selection by a user to interrupt the ongoing ingress action. The means can include, for example, a button, icon, or other indicator configured to be selected by a user to control one or more of the ongoing ingress actions. Examples of control means allowing interruption of the ongoing ingress action include a stop button, a start button, a pause button, a cancel button, or a restart button. The ingress activity notifications 302, 304, 306, 308, 310 can also include information based on the geographical location for the data source associated with an ongoing ingress action. Each of the example ingress activity notifications 302, 304, 306, 308, 310 is described in further detail below.

As shown in FIG. 3, example ingress activity notification 302 includes both real-time ingress information related to and a means for interrupting an ongoing ingress action occurring between a "Home Office Device" data source and the shared storage space. The real-time ingress information displayed within the ingress activity notification 302 includes the identification of the data source, e.g. "Home Office Device," and the identification of the state of the ongoing ingress action currently being performed, e.g. "Syncing." The ingress activity notification 302 also includes a stop button 312 configured for selection by the user of the ingress dashboard 300. If the user selects the stop button 312, the data transfer between the "Home Office Device" and the shared storage space will be halted. Finally, the ingress activity notification 302 includes a geographical location indicator 314 used in association with a source location map 316 as a key to identify the location of the "Home Office Device" data source associated with the ongoing ingress action.

Example ingress activity notification 304 includes the identification of the data source, e.g. "Work Office Device," the state of the ongoing ingress action currently being performed, e.g. "Idle," historical activity information describing a completed action previously performed between the data source and the shared storage space, e.g. "23.5 MB Uploaded," and a geographical location indicator 318 used in association with the source location map 316 to identify the location of the "Work Office Device." Example ingress activity notification 306 includes the identification of the data source, e.g. "Home Mobile Device," and the identification of the state of the ongoing ingress action currently being performed, e.g. "Uploading." The ingress activity notification 306 also includes a stop button 320 configured for selection by the user of the ingress dashboard 300 and a geographical location indicator 322 used in association with the source location map 316 as a key to identify the location of the "Home Mobile Device."

Example ingress activity notification 308 includes the identification of the data source, e.g. "Spouse Mobile Device," the state of the ongoing ingress action currently being performed, e.g. "Idle," and a geographical location indicator 324 used in association with the source location map 316 to identify the location of the "Spouse Mobile Device." Finally, example ingress activity notification 310 includes the identification of the data source, e.g. "Heart Monitor Device," the state of the ongoing ingress action currently being performed, e.g. "Idle," and historical activity information describing a completed action previously performed between the data source and the shared storage space, e.g. "1.2 MB Uploaded." There is no separate geographical location associated with the "Heart Monitor Device," as it can be, for example, a third-party application run in association with the "Home Mobile Device" data source. Alternatively, the "Heart Monitor Device" could be a separate hardware-based data source, in which case, a geographical location could be displayed if available. Each of the ingress activity notifications 302, 304, 306, 308, 310 described above includes one or more examples of the type of real-time and historical ingress information that can be displayed within the ingress dashboard 300, though other types of information are also possible.

FIG. 3 also includes an example detailed ingress activity notification 326 associated with the ingress activity notification 306. The detailed ingress activity notification 326 can be displayed within the ingress dashboard 300 in response to selection of the ingress activity notification 306. The ingress activity notification 306 can be selected, for example, based on a user hovering-over, clicking-on, highlighting, using a keyboard to select, or otherwise indicating the selection of the ingress activity notification 306. The detailed ingress activity notification 326 can, for example, include information identifying the data being received by the shared storage space, the elapsed time for the ongoing ingress action, and the time remaining for the ongoing ingress action.

In detailed ingress activity notification 326, the display of "Upload Started: 1:02 pm" indicates the elapsed time for the ongoing ingress action. The detailed ingress activity notification 326 can also include a graphical progress bar, such as is present in the ingress activity notification 306, to indicate the elapsed time for the ongoing ingress action. The display of "Time to Finish: 2 hrs 3 min" indicates the time remaining for the ongoing ingress action. Alternatively, the time remaining could be indicated with a graphical progress bar. The "Preview" section showing thumbnail icon-style pictures of cats can identify the data being received by the shared storage space. The "Preview" section can be used in conjunction with both image data and other types of files or documents, for example, by displaying a thumbnail for the type of data (e.g. text document, spreadsheet document, etc.) or an image of some portion of the file or document.

The detailed ingress activity notification 326 can also include means configured for selection by a user to interrupt the ongoing ingress action or to generate an alert associated with the ongoing ingress action. The control means allowing interruption of the ongoing ingress can include a stop button 328, a pause button 330, and a restart button 332. Selection of the stop button 328 will stop the ongoing ingress action, selection of the pause button 330 will halt the ongoing ingress action until another indication is received, and selection of the restart button 332 will start the ongoing ingress action over, potentially removing the data that has already been transferred. The control means allowing the user to generate an alert can include an alert button 334. If the user selects the alert button 334, the user can be prompted to indicate how and when an alert notification is provided to the user. For example, the user can select to receive an email, popup window alert, taskbar notification, text message, or any other type of alert when certain conditions occur: the ongoing ingress action is completed, a threshold amount of data has been transferred during the ongoing ingress action, a threshold amount of time has elapsed during the ongoing ingress action, etc. The alert received by a user can be useful in controlling how the shared storage space is allocated to data from various data sources.

Figure 4:
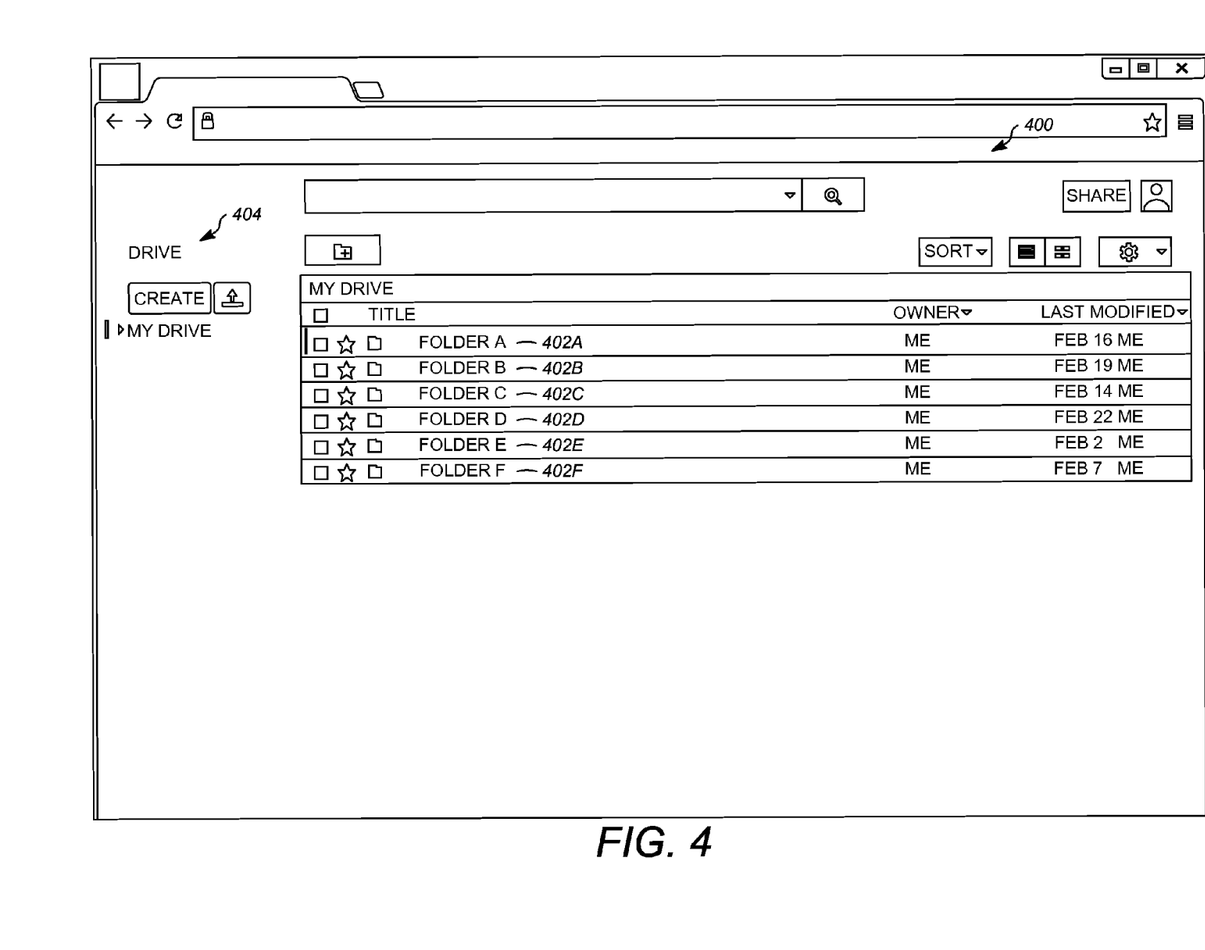
FIG. 4 shows an example interface for a shared storage space.

FIG. 4 shows an example interface 400 for a shared storage space. In the illustrated example, the shared storage space can include a storage system, or drive, for storing data or objects. The storage system and any different or additional applications or systems that could be used in the shared storage space can be provided in the form of software instructions that are executed by a processor or computer, such as the one or more server computers 132 of the application hosting service 130 shown in FIG. 1. A plurality of objects in the form of folders 402a-f can indicate areas of storage within the storage system and can be displayed within the interface 400 to the shared storage space, for example, using a tab-style access window denoted by the tag 404, "Drive." Each of the folders 402a-f in the shared storage space can include files or other forms of data and can be designated as storage targets to receive data transferred by one or more of the data sources during an ongoing ingress action.

Figure 5:
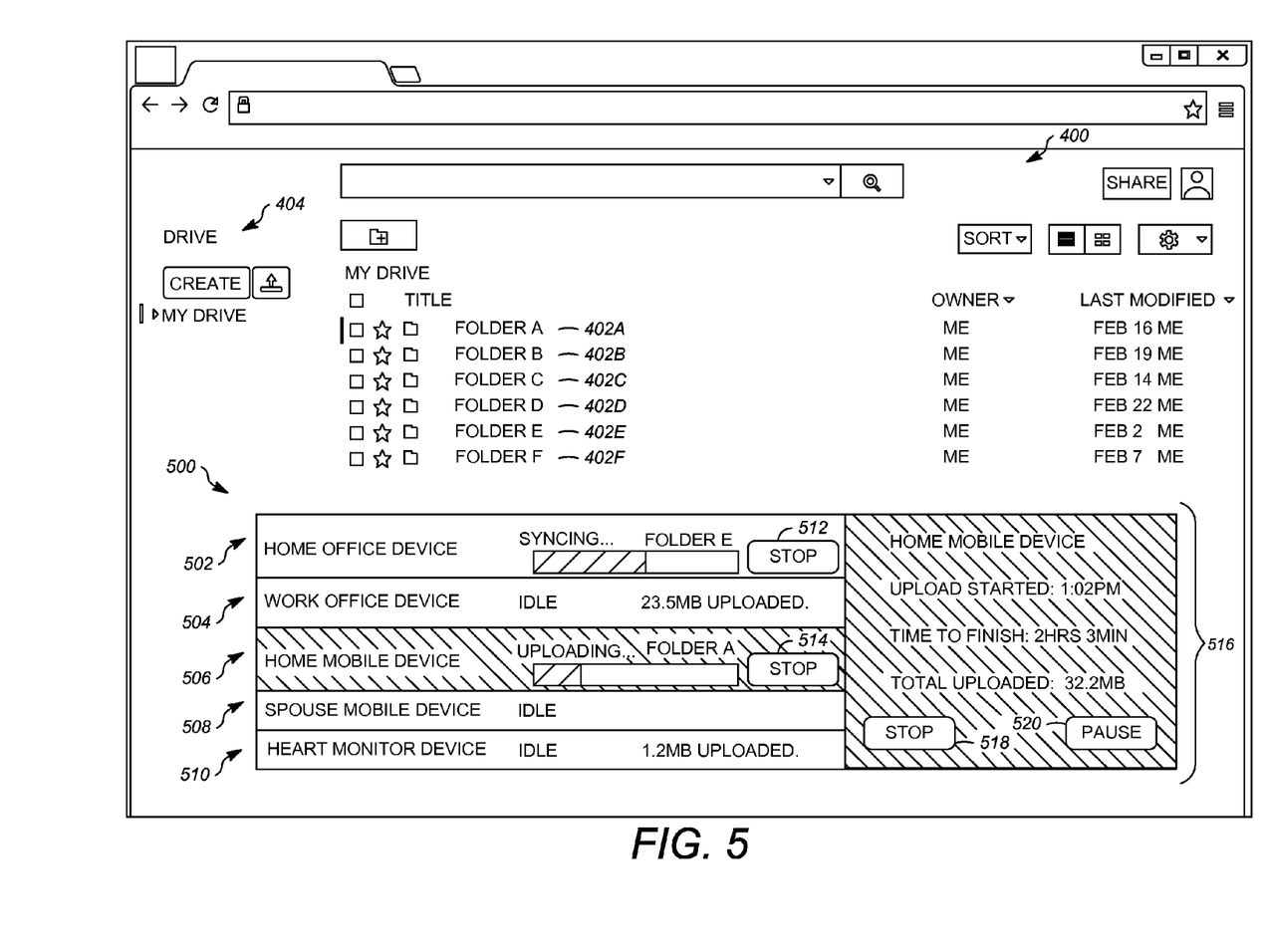
FIG. 5 shows another example ingress dashboard for ongoing ingress actions embedded in the example interface for the shared storage space of FIG. 4.

FIG. 5 shows another example ingress dashboard 500 for ongoing ingress actions embedded in the example interface 400 for the shared storage space of FIG. 4. In this example, the ingress activity notifications 502, 504, 506, 508, 510 are similar to the ingress activity notifications 302, 304, 306, 308, 310 shown in FIG. 3 in that they represent the same ongoing ingress actions; however, the information displayed in the ingress activity notifications 502, 504, 506, 508, 510 takes a more compact and limited format. This embedded or compact form of the ingress dashboard 500 can be used in conjunction with the interfaces to many different applications, such as mail applications, document editors, news readers, cloud-based storage applications, or, for example, with a mobile device application that can require a more limited view based on display constraints. The embedded form of the ingress dashboard 500 is thus useful for monitoring ongoing ingress actions while the user is interacting with other applications.

In the embedded form of the ingress dashboard 500, ingress activity notification 502 includes both real-time ingress information related to and a means for interrupting the ongoing ingress action occurring between the "Home Office Device" data source and the shared storage space in a similar form as was included in the ingress activity notification 302 described in association with FIG. 3. For example, the real-time ingress information displayed within the ingress activity notification 502 includes the identification of the data source, e.g. "Home Office Device," and the state of the ongoing ingress action currently being performed between the data source and the shared storage space, e.g. "Syncing." The ingress activity notification 502 also includes a stop button 512 configured for selection by the user of the ingress dashboard 500. In contrast to the ingress activity notification 302 shown in FIG. 3, the compact version of the ingress activity notification 502 does not include a geographical location indicator. However, the ingress activity notification 502 does identify the location within the shared storage space where the data is being transferred, i.e. the folder E 402e. This destination identification is useful since the ingress dashboard 500 is embedded within the interface 400 to the shared storage space.

The ingress activity notifications 504, 508, and 510 include the same real-time and historical ingress information as was described in respect to ingress activity notifications 304, 308, and 310, with the exception that the compact forms do not include geographical location indicators. The ingress activity notification 506 is similar to the ingress activity notification 502 in that it includes the identification of the data source, e.g. "Home Mobile Device," the state of the ongoing ingress action currently being performed between the data source and the shared storage space, e.g. "Uploading," and a stop button 514 configured for selection by the user of the ingress dashboard 500 to interrupt the ongoing ingress action. The ingress activity notification 506 also identifies the location within the shared storage space where the data is being transferred, i.e. the folder A 402a. However, the ingress activity notification 506 does not include a geographical location indicator.

FIG. 5 also includes an example detailed ingress activity notification 516 associated with the ingress activity notification 506. The detailed ingress activity notification 516, in a similar format to the detailed ingress activity notification 326 described in reference to FIG. 3, can include the elapsed time for the ongoing ingress action and the time remaining for the ongoing ingress action. In detailed ingress activity notification 516, the display of "Upload started: 1:02 pm" indicates the elapsed time for the ongoing ingress action and the display of "Time to Finish: 2 hrs 3 min" indicates the time remaining for the ongoing ingress action. In contrast to the detailed ingress activity notification 326, no information identifying the data being received by the shared storage space is displayed in the detailed ingress activity notification 516.

The detailed ingress activity notification 516 can also include means configured for selection by a user to interrupt the ongoing ingress action. The control means allowing interruption of the ongoing ingress can include a stop button 518 and a pause button 520. Selection of the stop button 518 will stop the ongoing ingress action and selection of the pause button 520 will halt the ongoing ingress action until another indication is received. In contrast to the detailed ingress activity notification 326 described in reference to FIG. 3, no control means allowing the user to generate an alert are included in the detailed ingress activity notification 516 having a compact format, though inclusion of this feature is also possible.

Figure 6:
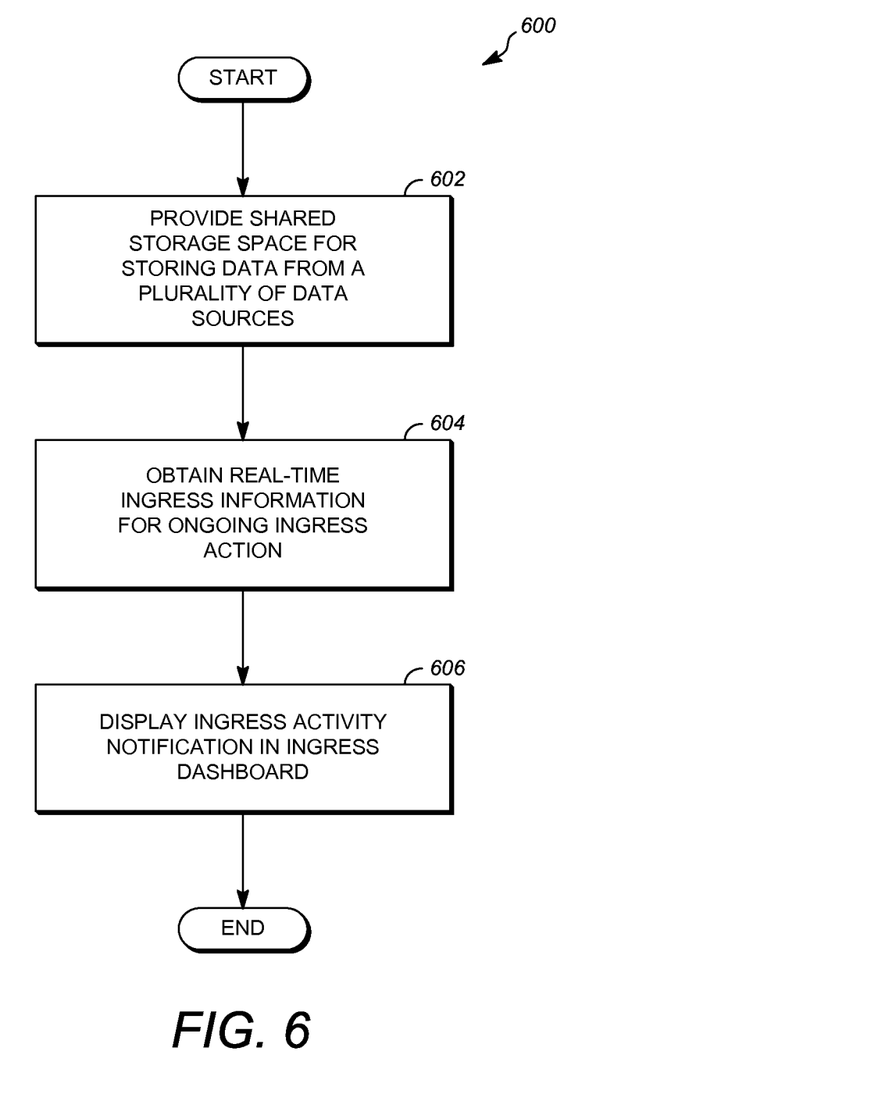
FIG. 6 is a flowchart showing an example of a process for visualizing and controlling ongoing ingress actions associated with a shared storage space.

FIG. 6 is a flowchart showing an example of a process 600 for visualizing and controlling ongoing ingress actions associated with a shared storage space. The operations described in connection with the process 600 can be performed at one or more computers, such as at the one or more server computers 132 of the application hosting service 130. When an operation is performed by one or more computers, it is completed when it is performed by one computer. The operations described in connection with the process 600 can also be embodied as a non-transitory computer readable storage medium including program instructions executable by one or more processors that, when executed, cause the one or more processors to perform the operations. For example, the operations described in connection with the process 600 could be stored at the memory 220 of a respective one of the server computers 132 and be executable by the CPU 210 thereof.

At operation 602, a shared storage space is provided for receiving and storing data from a plurality of data sources. The shared storage space can be provided, for example, by one of the server computers 132 of FIG. 1 and can be displayed to one or more of the plurality of users in the form of an interface such as the interface 400 shown in FIGS. 4-5. The shared storage space can include a storage system represented within the interface 400 by a listing of folders 402a-f available to receive and store data transferred to the storage system from data sources such as user systems 110, 120. These user systems 110, 120 can take the form of mobile computing devices, desktop devices, tablets, smart phones, third-party applications, or any other type of data source.

At operation 604, real-time ingress information describing at least one ongoing ingress action currently being performed between one of the plurality of data sources and the shared storage space is obtained, for example, using one of the server computers 132 of FIG. 1. As described above, real-time ingress information can include information identifying a data source, information identifying a state of the ongoing ingress action associated with the at least one ongoing ingress action, or information identifying a data storage location within the shared storage space associated with the at least one ongoing ingress action.

At operation 606, an ingress activity notification based on the at least one ongoing ingress actions is displayed within an ingress dashboard associated with the shared storage space. As described above, the ingress activity notification can display some portion of the real-time ingress information obtained in operation 604. For example, the ingress activity notification can include a tag such as "Home Office Device" to describe a data source, a tag such as "Uploading" to describe the type of ongoing ingress action, or a tag such as "1.2 MB uploaded" to describe a previously completed ingress action. The ingress activity notification can also include a means configured for selection by a user to interrupt the ongoing ingress action. As described above, buttons or icons associated with stopping, pausing, and restarting can all serve as interruption means. Geographical locations associated with the data sources performing ongoing ingress actions can also be displayed as part of or in conjunction with the ingress activity notifications.

If a specific ingress activity notification has been selected or highlighted by a user, operation 606 can also include displaying a detailed ingress activity notification based on the selected ingress activity notification. For example, the detailed ingress activity notification 326 was generated in response to a user selecting or highlighting the ingress activity notification 306 as described in reference to FIG. 3 and the detailed ingress activity notification 516 was generated in response to a user selecting or highlighting the ingress activity notification 506 as described in reference to FIG. 5. The detailed ingress activity notification can include information identifying the data being received by the shared storage space, the elapsed time for the ongoing ingress action, and the time remaining for the ongoing ingress action. The detailed ingress activity notification can also include means configured for selection by a user to interrupt the ongoing ingress action or generate an alert associated with the ongoing ingress action. The process 600 then ends.

If at least two ongoing ingress actions are currently being performed in accordance with the process 600, the ingress dashboard, e.g. either the full ingress dashboard 300 of FIG. 3 or the compact ingress dashboard 500 of FIG. 5, can be configured to allow grouping of the two or more ongoing ingress actions. For example, the user can select two or more ongoing ingress actions by selecting the applicable ingress activity notifications and provide an indication to the one or more server computers 132 to create an ongoing ingress action group. The ingress dashboard can then be configured to display a single ingress activity notification based on the ongoing ingress action group. In addition, the ingress action group can be singularly controlled by the user, that it, the user can stop, pause, restart, or perform another action in respect to the ongoing ingress actions within the ongoing ingress action group at the same time.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described here is merely exemplary, and not mandatory; functions performed by a single system component may instead be performed by multiple components, and functions performed by multiple components may instead performed by a single component.

The words "example" or "exemplary" are used here to mean serving as an example, instance, or illustration. Any aspect or design described here as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described here can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described here do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described here, such as client computers and server computers, can be implemented using general purpose computers/processors with a computer program that, when executed, carries out any of the respective methods, algorithms and/or instructions described here. In addition or alternatively, for example, special purpose computers/processors can be utilized which can contain specialized hardware for carrying out any of the methods, algorithms, or instructions described here.

Some portions of the above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations described. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described here. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method, comprising:
providing, by a server computer, a shared storage space for receiving and storing data from a plurality of data sources;
obtaining real-time ingress information describing at least one ongoing ingress action currently being performed between one of the plurality of data sources and the shared storage space; and
outputting, for display in an ingress dashboard associated with the shared storage space, an ingress activity notification based on the at least one ongoing ingress action, wherein the ingress activity notification includes a progress bar indicating an elapsed time and a time remaining of the at least one ongoing ingress action and includes stop and pause controls to interrupt the at least one ongoing ingress action.

2. The method of claim 1, wherein the ingress activity notification includes information identifying a data source from the plurality of data sources associated with the at least one ongoing ingress action, wherein the data source is a computing device or an application associated with the computing device.

3. The method of claim 1, wherein the ingress activity notification includes information identifying a state associated with the at least one ongoing ingress action.

4. The method of claim 1, wherein the ingress activity notification includes information identifying a data storage location within the shared storage space associated with the at least one ongoing ingress action.

5. The method of claim 1, further comprising:
outputting, for display in the ingress dashboard, a geographical location for at least one of the plurality of data sources associated with the at least one ongoing ingress action.

6. The method of claim 1, wherein the ingress activity notification further includes information identifying the data being received by the shared storage space.

7. The method of claim 1, wherein the ingress activity notification further includes means configured for selection by a user to generate an alert associated with the ongoing ingress action.

8. The method of claim 7, wherein the alert is generated when a threshold amount of data is transferred to the shared storage by the ongoing ingress action.

9. The method of claim 7, wherein the alert is generated when a threshold amount of time has elapsed during the ongoing ingress action.

10. The method of claim 1, wherein at least two ongoing ingress actions are currently being performed, further comprising:
receiving, from a user, an indication to create an ongoing ingress action group including the at least two ongoing ingress actions; and
outputting, for display in the ingress dashboard associated with the shared storage space, an ingress activity notification based on the ongoing ingress action group.

11. The method of claim 10, wherein the ingress activity notification based on the ongoing ingress action group includes means configured for selection by a user to simultaneously interrupt the at least two ongoing ingress actions within the ongoing ingress action group.

12. An apparatus, comprising:
one or more processors; and
one or more memory devices for storing program instructions used by the one or more processors, wherein the program instructions, when executed by the one or more processors, cause the one or more processors to:
provide a shared storage space for receiving and storing data from a plurality of data sources;
obtain real-time ingress information describing at least one ongoing ingress action currently being performed between one of the plurality of data sources and the shared storage space; and
output, for display in an ingress dashboard associated with the shared storage space, an ingress activity notification based on the at least one ongoing ingress action wherein the ingress activity notification includes a progress bar indicating an elapsed time.

13. The apparatus of claim 12, wherein the one or more processors are further configured to:
output, for display in the ingress dashboard and in response to selection of the ingress activity notification, a detailed ingress activity notification based on the selected ingress activity notification.

14. The apparatus of claim 13, wherein the detailed ingress activity notification includes information identifying the data being received by the shared storage space.

15. The apparatus of claim 13, wherein the detailed ingress activity notification includes information identifying at least one of an elapsed time for the at least one ongoing ingress action and a time remaining for the at least one ongoing ingress action.

16. The apparatus of claim 13, wherein the detailed ingress activity notification includes means configured for selection by a user for at least one of interrupting the at least one ongoing ingress action and generating an alert associated with the at least one ongoing ingress action.

17. The apparatus of claim 12, wherein at least two ongoing ingress actions are currently being performed and wherein the one or more processors are further configured to:
  receive, from a user, an indication to create an ongoing ingress action group including the at least two ongoing ingress actions; and
  output, for display in the ingress dashboard associated with the shared storage space, an ingress activity notification based on the ongoing ingress action group.

18. The apparatus of claim 17, wherein the ingress activity notification based on the ongoing ingress action group includes means configured for selection by a user to simultaneously interrupt the at least two ongoing ingress actions within the ongoing ingress action group.

19. The apparatus of claim 12, wherein the ingress activity notification includes information identifying a data source from the plurality of data sources associated with the at least one ongoing ingress action, a state associated with the at least one ongoing ingress action, and a data storage location within the shared storage space associated with the at least one ongoing ingress action and wherein the data source is a computing device or an application associated with the computing device.

20. The apparatus of claim 12, wherein the ingress activity notification includes means configured for selection by a user to interrupt the ongoing ingress action.

* * * * *